US009919942B2

(12) United States Patent
Sorg et al.

(10) Patent No.: US 9,919,942 B2
(45) Date of Patent: Mar. 20, 2018

(54) REGENERATIVE CHAMBER FOR A GLASS MELTING FURNACE

(75) Inventors: Alexander Sorg, Aschaffenburg (DE); Matthias Lindig, Ingelheim (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 496 days.

(21) Appl. No.: 13/466,255

(22) Filed: May 8, 2012

(65) Prior Publication Data
US 2012/0288812 A1   Nov. 15, 2012

(30) Foreign Application Priority Data

May 10, 2011  (DE) ................. 10 2011 075 619

(51) Int. Cl.
| C03B 5/237 | (2006.01) |
| F23L 15/02 | (2006.01) |
| F28D 17/02 | (2006.01) |
| F28F 27/02 | (2006.01) |

(52) U.S. Cl.
CPC .............. *C03B 5/237* (2013.01); *F23L 15/02* (2013.01); *F28D 17/02* (2013.01); *F28F 27/02* (2013.01); *Y02E 20/348* (2013.01); *Y02P 40/535* (2015.11)

(58) Field of Classification Search
CPC  C03B 5/237; F28D 17/02; F23L 15/02; F28F 27/02; Y02P 40/535; Y02E 20/348
USPC ....... 432/180, 185, 148, 179, 181, 182, 194, 432/249
See application file for complete search history.

(56) References Cited

U.S. PATENT DOCUMENTS

| 1,836,412 | A | | 12/1931 | Trinks |
| 2,259,913 | A | * | 10/1941 | Walters .......................... 165/9.3 |
| 2,834,406 | A | * | 5/1958 | Otto ................................. 432/54 |
| 4,088,180 | A | | 5/1978 | Tsai |
| 4,256,173 | A | | 3/1981 | Tsai et al. |
| 4,257,476 | A | | 3/1981 | Tsai |
| 4,394,122 | A | * | 7/1983 | Bueno et al. ................... 432/30 |
| 4,540,361 | A | | 9/1985 | Gagne |
| 4,651,810 | A | * | 3/1987 | Triessnig ....................... 165/9.2 |
| 5,934,899 | A | * | 8/1999 | Joshi et al. .................... 432/181 |
| 2006/0101859 | A1 | * | 5/2006 | Takagi .................... C03B 5/187 65/32.5 |

FOREIGN PATENT DOCUMENTS

| DE | 19543743 | | 5/1997 |
| GB | 389881 | * | 3/1933 |
| GB | 510056 | | 7/1939 |
| GB | 711554 | | 7/1954 |
| SU | 1020709 | | 5/1983 |

OTHER PUBLICATIONS

European Search Report, dated Mar. 12, 2013.

* cited by examiner

*Primary Examiner* — Alissa Tompkins
*Assistant Examiner* — Benjamin W Johnson
(74) *Attorney, Agent, or Firm* — Greer, Burns & Crain, Ltd.

(57) ABSTRACT

A regenerative chamber for a glass melting furnace having a defined cross-section and wherein the regenerative chamber includes multiple slotted arches and above the same there are disposed transfer layers, and wherein a grating is installed on the transfer layers. A movable flow barrier is provided above the slotted arches that is inserted from the outside into the regenerative chamber and by means of which the cross-section of the regenerative chamber can be reduced.

14 Claims, 9 Drawing Sheets

REGENERATIVE CHAMBER FOR A GLASS MELTING FURNACE

BACKGROUND OF THE INVENTION

The invention relates to a regenerative chamber for a glass melting furnace having a defined cross-section, and wherein the regenerative chamber includes multiple slotted arches and above the same there are disposed transfer layers, and wherein a grating is installed on the transfer layers.

The regenerative heating of melting furnaces plays a major role in melting technology. Glass melting furnaces include, for example, two regenerative chambers. Each of these regenerative chambers provides for a grating means that is able to store heat. Using the first regenerative chamber, combustion air can be preheated up to 1300° C. Most of the time, combustion air is introduced into the melting furnace above the nozzle inlet for fossil fuels. This is, therefore, the firing side of the melting furnace. On said firing side, the fuel is mixed with the oxygen in the combustion air. The exothermic reaction of the oxygen in the combustion air with the fuel causes the raw materials (melting charge) located in the melting furnace to melt. The waste gases that are produced during the melting action of the raw materials leave the melting furnace at a temperature of approximately 1500° C. and are removed by means of a second regenerative chamber; the waste gases still have a temperature of approximately 500° C. when they leave the regenerative chamber. After a certain amount of time, the firing side is switched in order for the combustion air to be routed through the second regenerative chamber, meaning the combustion air is now routed through the regenerative chamber through which the waste gases have been routed until now.

The efficiency of the preheating of the chamber, and thereby also the heat transfer to the combustion air, depend significantly on how evenly the through-flow of the combustion air fills the cross-section of the regenerative chamber. Especially in large melting furnaces, an even through-flow is no longer ensured across the total cross-section of the chamber. Correspondingly, the waste gases and/or the combustion air flow often only through a section of the regenerative chamber—most of the time, this is only the section of the regenerative chambers that is directed away from the melting furnace. As a consequence, the heat of the waste gases is only very unevenly transferred to the grating that is disposed inside the regenerative chamber.

SUMMARY OF THE INVENTION

The present invention seeks to provide a regenerative chamber for a melting furnace with an even flow-through of waste gases and/or combustion air.

The object of the present invention is achieved by means of a movable flow barrier provided above the slotted arches that is inserted from the outside into the regenerative chamber and by means of which the cross-section D of the regenerative chamber can be reduced.

The invention thus relates to a regenerative chamber for a glass melting furnace having a defined cross-section. The regenerative chamber has multiple slotted arches and disposed thereupon are transfer layers, and wherein a grating is installed above the transfer layers. A movable flow barrier is inserted from the outside into the regenerative chamber. By means of this flow barrier, it is possible to reduce the cross-section of the regenerative chamber. The flow barrier consists of several segments, and wherein the segments can include interruptions in and of themselves. These segments can be, for example, plate or bar elements that can be disposed below, within or above the transfer layers that are envisioned in the regenerative chamber.

BRIEF DESCRIPTION OF THE DRAWINGS

Embodiments of the invention are depicted in the figures and will be described in further detail below. Shown are in.

DETAILED DESCRIPTION OF THE PREFERRED EMBODIMENTS

Figure 1:
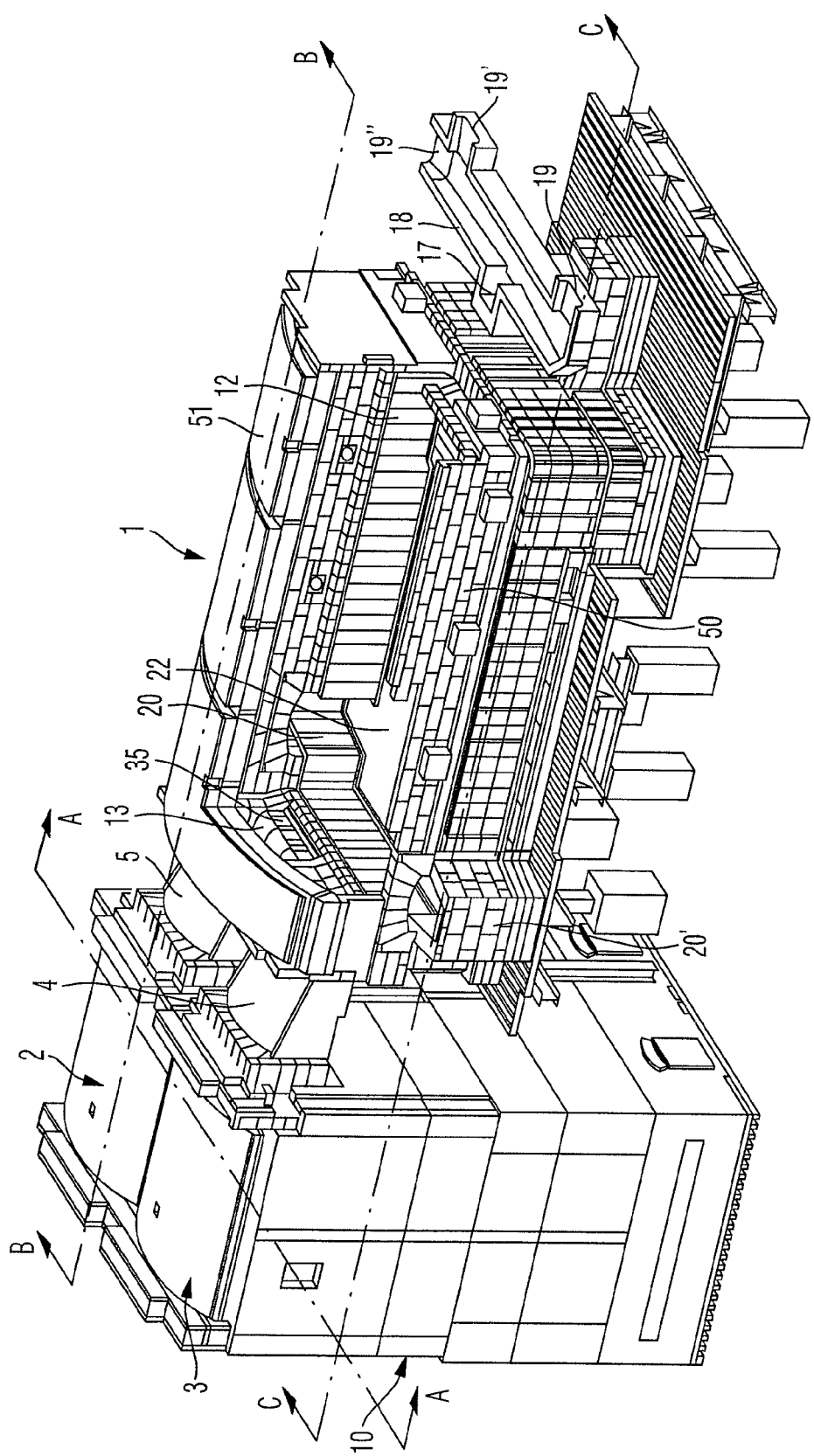
FIG. 1 a perspective view of a glass melting furnace with two regenerative chambers.

FIG. 1 shows a perspective view of a glass melting furnace 1 with two regenerative chambers 2, 3 disposed therein. Said regenerative chambers 2, 3 are configured as individual chambers. In conjunction with the two regenerative chambers 2, 3 that are disposed therein, the glass melting furnace 1 constitutes a configuration 21. The regenerative chambers 2, 3 are surrounded by a fireproof wall 10 and provided with a roof. The regenerative chambers 2, 3 are connected to the glass melting furnace 1 by means of a burner neck(s) 4 and/or 5. Since a part of the wall 50 and of the roof 51 of the glass melting furnace 1 have been omitted from the representation, a melting chamber 12 is visible. The melting charge, which is introduced by means of two opposite feeder houses 20, 20', is melted in said melting chamber 12. The resulting melt is identified by reference number 22.

A passage 17 is disposed across from the two burner necks 4, 5 that connects the melting chamber 12 with a distributor 18. Said distributor 18 includes several spring connections 19, 19', 19". The melt 22 can leave the melting chamber 12 by means of the passage 17 and reach the distributor 18. From the distributor 18, the melt 22 reaches the corresponding spring connection 19, 19', 19" that is connected to a processing station. However, a processing station has been omitted from the representation in FIG. 1. Passage 17, distributor 18 and the spring connections 19, 19', 19" are depicted without a roof.

The burner neck 4 and the burner neck 5 each comprise an orifice by means of which a gas exchange can take place between the corresponding regenerative chambers 2 and/or 3 and the melting chamber 12. In this context, FIG. 1 only shows the opening 13 of the burner neck 5. A nozzle inlet location 35 for a fossil fuel is disposed below said opening 13 through which the fossil fuel can be introduced into the melting chamber 12.

Figure 2:
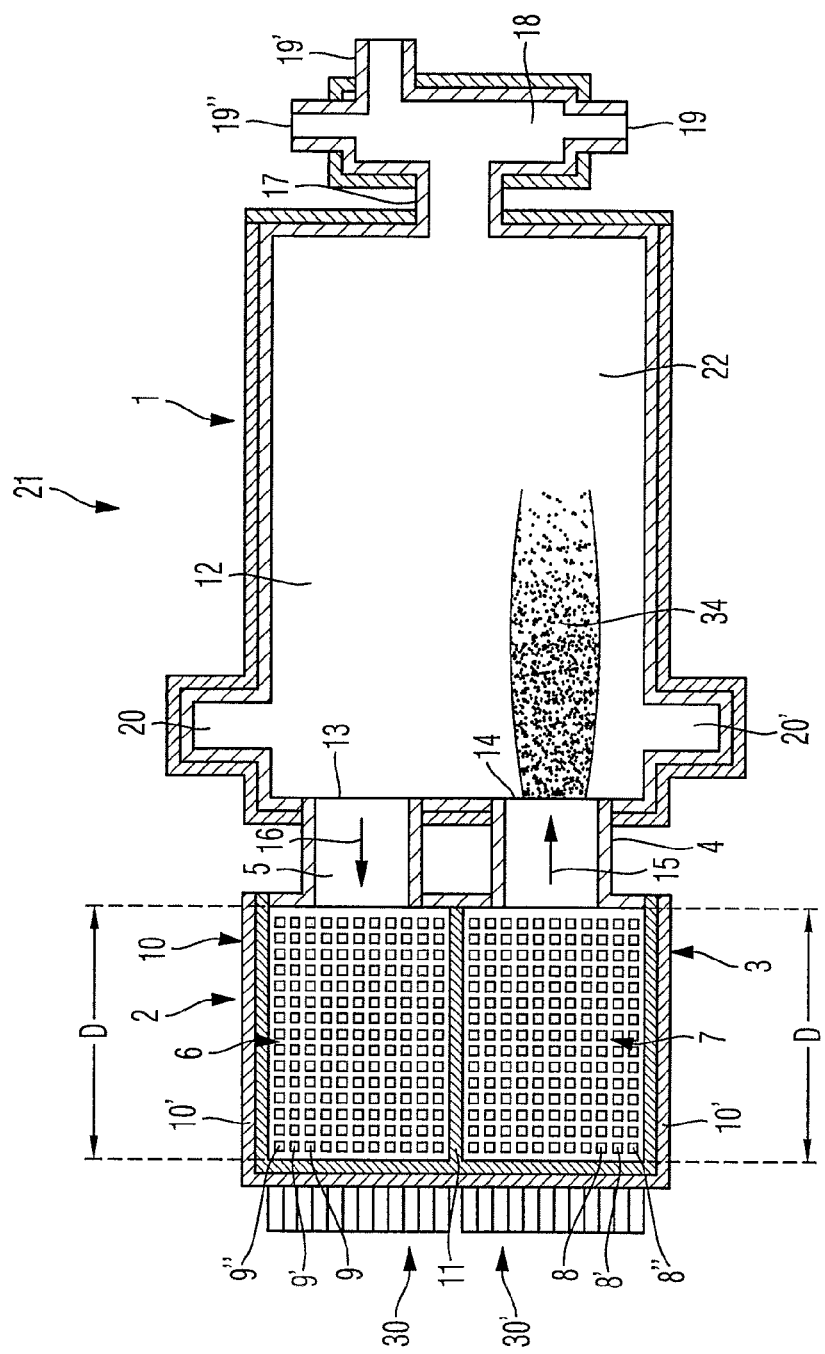
FIG. 2 a section A-A through the glass melting furnace with the two regenerative chambers as shown in FIG. 1.

FIG. 2 shows a view of a section through plane A-A of the glass melting furnace 1 that is represented in FIG. 1, including the two regenerative chambers 2, 3 that are configured as individual chambers, and wherein the glass melting furnace 1 as well a the two regenerative chambers 2, 3 are only depicted schematically. The glass melting furnace 1 is connected to the corresponding regenerative chamber 2, 3 by means of burner neck(s) 4 and/or 5.

Each regenerative chamber 2, 3 has disposed therein a grating 6, 7 as heat storage means of the regenerative chambers 2, 3. Said grating 6, 7 comprises multiple layers of checker bricks that are disposed on top of each other. Each layer in turn consists of several checker bricks 8, 8', 8" and/or 9, 9', 9" that are disposed adjacent relative to each other. These checker bricks can be, for example, pot stones.

The two regenerative chambers 2, 3 include several wall sections 10' and are separated from each other by a separating wall 11. The separating wall 11 therein is also a component of the wall 10. Both regenerative chambers 2, 3 have a defined cross-section D that is defined by the distances of the wall sections 10' and/or the separating wall 11 of wall 10 relative to each other.

The flow barriers 30, 30' are disposed in each of the regenerative chambers 2, 3; they are inserted from the outside into the lower region of the corresponding regenerative chamber 2, 3. To this end, each regenerative chamber 2, 3 includes orifices in the wall 10 through which it is possible to insert the flow barriers 30, 30' into the corresponding regenerative chamber 2, 3. However, the orifices in the wall 10 cannot be seen in FIG. 2 because said orifices are disposed below the grating 6, 7 of the corresponding regenerative chamber 2, 3. Each flow barrier 30, 30' consists of multiple segments, and wherein, for the sake of better clarity, the individual segments have not been identified by reference symbols in FIG. 2.

Passage 17 is discernible across from the two burner necks 4, 5 and connects the melting chamber 12 with the distributor 18. Said distributor 18 includes multiple spring connections 19, 19', 19". Also visible are the two feeder houses 20, 20'; they are located across from each other and the raw materials that are to be melted can be introduced by means of them.

The burner neck 4 includes the orifice 14 on the side that is directed toward the melting chamber 12 through which the combustion air coming from the regenerative chamber 3, which is preheated and contains oxygen, is introduced into the melting chamber 12 of the melting furnace; this is indicated by the arrow 15. The combustion air is preheated up to 1300° C. and mixed with a fossil fuel. Said fossil fuel is introduced below the orifice 14 of the burner neck 4 into the melting chamber 12 through a nozzle inlet location that is not visible in FIG. 2, and whereby the fuel becomes ignited. The flame that results is identified by reference number 34. Thus, the firing side is in the section of the melting furnace 1 that has the burner neck 4 disposed therein.

The energy that is released during this exothermic reaction melts the melting charge that has been introduced into the melting chamber 12 by means of the feeder houses 20, 20'. Thereafter, the melt 22 migrates in the direction of passage 17. After leaving the passage 17, the melt 22 reaches the distributor 18. From here, the melt is able to leave the distributor 18 by means of the corresponding spring connection 19, 19', 19" and thus reach the processing station. However, a representation of a processing station has been omitted from FIG. 2.

The waste gases that are generated during the melting of the melting charge are routed out of the melting chamber 12 via an orifice 13 of the burner neck 5 and are removed from the configuration 21 by means of the regenerative chamber 2, which has been indicated by the arrow 16. The waste gases that have been generated during the melting action of the raw materials, meaning of the melting charge, have a temperature of approximately 1500° C. when they exit from the glass melting furnace. After traversing the grating 6 of the regenerative chamber 2, the waste gases only have a temperature of approximately 500° C.

After a certain amount of time, for example after 20 minutes, the firing side is switched, which means that now the waste gases are removed from the glass melting furnace through the orifice 14 of the burner neck 4, and the combustion air is introduced through orifice 13 of the burner neck 13 into the melting chamber 12 of the glass melting furnace 1.

Figure 3:
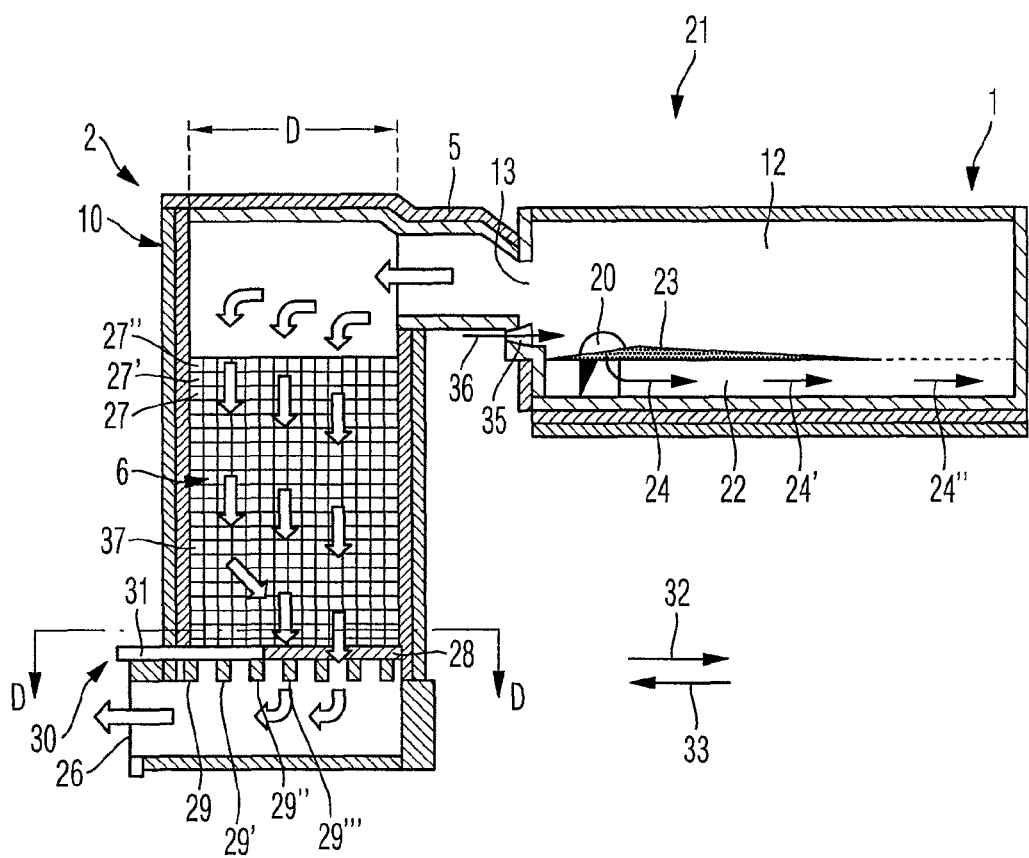
FIG. 3 a section B-B through the glass melting furnace as shown in FIG. 1.

FIG. 3 schematically depicts a section along the line B-B of the glass melting furnace 1 as represented in FIG. 1 having the regenerative chamber 2 that is connected to the glass melting furnace 1 by means of the burner neck 5. Said regenerative chamber 2 has a cross-section D. In the lower region of the melting chamber 12 of the glass melting furnace 1, melt 22 is visible and disposed thereupon is the, at least in part, as of yet un-melted melting charge 23. The glass melt 22 therein flows from the feeder houses 20, 20', via which the melting charge 23 is introduced into the melting chamber 12, in the direction of the passage 17 and then continues on to the distributor 18. This is indicated by the flow arrows 24, 24' and 24". Passage 17 and distributor 18 have been omitted from the representation for this step that is implemented by the configuration 21.

The waste gases are removed from the melting chamber 12 via orifice 13. The waste gases that have temperatures of up to 1500° C. are routed through grating 6 in the regenerative chamber 2, and wherein the grating 6 stores the energy thus releasing the waste gases from the regenerative chamber 2 via outlet 26 having a temperature of only up to 500° C. The grating 6 consists of checker bricks that are disposed on top of each other in multiple layers; presently, only the layers 27, 27' and 27" are identified by reference symbols. The grating 6 rests on the transfer layers 28 that are affixed, in turn, above several slotted arches 29, 29', 29", 29"', which are disposed adjacent relative to each other.

The nozzle inlet location 35 for a fossil fuel is disposed below the orifice 13 of the burner neck 5 through which the fossil fuel can be introduced into the melting chamber 12, which has been indicated by arrow 36. However, due to the fact that the firing side is not located in this region of the glass melting furnace 1, no fossil fuel is introduced to the melting chamber 12 of the glass melting furnace 1 by means of the nozzle inlet location 35. The nozzle inlet location 35 is thus closed, which can be achieved, for example, by means of the valves that, however, have been omitted from FIG. 3.

The flow barrier 30 is disposed above the slotted aches. Said flow barrier 30 reduces the size of the cross-section D of the regenerative chamber 2. This flow barrier 30 can consist of multiple segments that are disposed adjacent in relation to each other such as, for example, plate or bar elements, and wherein only segment 31 is visible in FIG. 3. The segments 31 therein extend through the wall 10 of the regenerative chamber 2 and can be moved in the direction of the arrows 32 and/or 33. Therefore, segments 31 can be moved in or out of the regenerative chamber 2. By moving the flow barrier 30 in or out of the regenerative chamber 2, it is possible to change the cross-section of the regenerative chamber 2 in the region of the transfer layers 28, thus achieving an optimal flow behavior of the waste gases. If the flow barrier 30 is inserted even further into the regenerative chamber 2, the cross-section of the same is reduced further, and whereby, in contrast, the reduced cross-section can be enlarged again if the flow barrier 30 is once more somewhat pulled out of the regenerative chamber 2. The flow barrier 30 therein can be moved by means of a motor or manually. It can consist of any temperature-resistant material that is able to withstand the temperature fluctuation and the high temperatures prevailing at that location. Thus, it is possible to provide said flow barrier 30, for example, as made of metal, a metal alloy or of ceramic materials. Although omitted from FIG. 3, the segments of the flow barrier 30 in and of themselves can include interruptions therein such as, for example, by way of holes and/or slots. Moreover, it is possible for the individual segments to consist of multiple individual segments that are connected to each other, which, however, has also been omitted in FIG. 3. These individual segments as well can include interruptions that are configured as slots and/or holes, and they can be present as plats or bars.

These interruptions allow a certain amount of the waste gases to traverse the flow barrier.

The flow profile of the waste gases inside the regenerative chamber 2 is indicated by several arrows. It can be seen that in the region of the flow barrier 30 none at all and/or almost no waste gases are able to pass through the transfer layers and the slotted arches, thus resulting in the waste gases from the region of the flow barrier 30 to be routed into the center of the regenerative chamber 2. Since the proportion of the waste gases in a section 37 of the regenerative chamber 2, that is directed away from the glass melting furnace, would be very high without such a flow barrier 30, said flow barrier 30 moves said proportion of the waste gases to the center of the regenerative chamber 2. This causes the waste gases to be evenly distributed inside the regenerative chamber 2, thus also achieving an even distribution of the energy of the waste gases on the grating 6.

Consequently, the flow barrier 30 serves for evening out the waste gases inside the regenerative chamber 2, thereby providing an even distribution of the energy on the grating 6.

Figure 4:
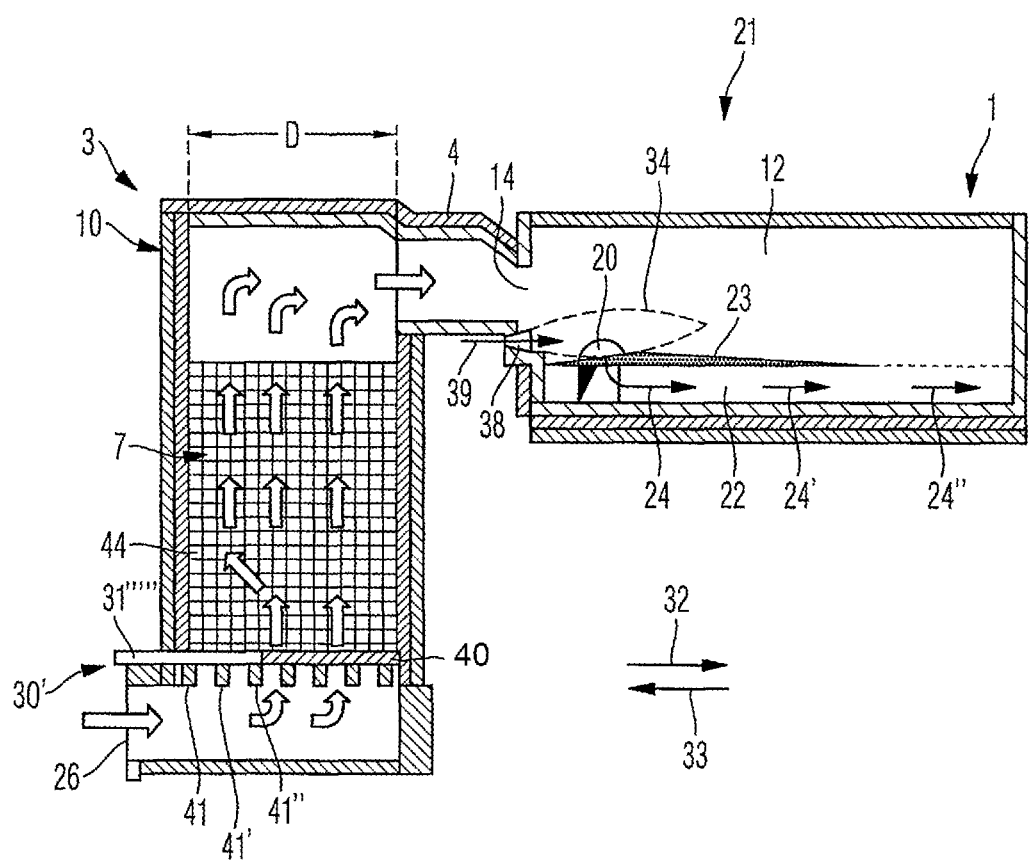
FIG. 4 a section C-C through the glass melting furnace as shown in FIG. 1.

FIG. 4 depicts a view of a plane C-C through the glass melting furnace 1 as shown in FIG. 1 having the regenerative chamber 3 that is connected to the melting chamber of the glass melting furnace 1 by means of the burner neck 4. The glass melting furnace 1 with the regenerative chamber 3 disposed thereon is only shown by way of a schematic representation. The burner neck 4 includes an orifice 14 by means of which the combustion air is supplied to the melting chamber. A nozzle inlet location 38 is disposed below the orifice 14 through which the fossil fuel is introduced into the melting chamber 12, which is indicated by the arrow 39. The fossil fuel is mixed with the combustion air and reacts with the oxygen of the combustion air, thus creating the flame 34 that is located above the melting charge 23. Therefore, the firing side is in the region of the burner neck 4, meaning that the melting charge is also melted in this area. The melt 22 migrates in the direction of the distributor 18, which is indicated by the arrows 24, 24', 24". The distributor 18, however, has been omitted from the representation as shown in FIG. 4.

The grating 7 is located inside the regenerative chamber 3 consisting, once again, of multiple layers of checker bricks. The grating 7 is disposed on transfer layers 40 located above multiple slotted arches 41, 41', 41", which are disposed adjacent relative to each other. This checker bricks can be, for example, pot stones.

The flow barrier 30' is disposed above the slotted arches 41, 41', 41". Said flow barrier 30' consists of multiple segments that are disposed adjacent relative to each other—as previously with the flow barrier 30 in regenerative chamber 2. However, FIG. 4 only depicts the segment 31''''. Segment 31'''' therein also traverses the wall 10 of the regenerative chamber 3 and can be moved in the direction of arrows 32 and/or 33. Consequently, the flow barrier 30' herein can also be moved in and out of the regenerative chamber 3.

By moving the individual segments 31 in the direction of the arrows 32 and/or 33, it is possible to adjust the cross-section of the regenerative chamber 2 in the area of the transfer layers 40 in such a way that optimal flow behavior of the combustion air is achieved. The flow barrier 30' can consist of any temperature-resistant material such as, for example, a metal, metal alloy or ceramic materials that are able to withstand the temperature fluctuations and high temperatures at that location. Although not shown in FIG. 4, the individual segments of the flow barrier 30' can in and of themselves include interruptions such as, for example, slots and/or holes.

The flow profile of the combustion air inside the regenerative chamber 3 is indicted by several arrows. In the region of the flow barrier 30', none at all or only a very small amount of the combustion air is able to traverse the transfer layers 40, meaning that the combustion air in the region of the flow barrier 30' is routed to the center of the regenerative chamber 3. This way, it is prevented that an elevated proportion of the combustion air accumulates in a section 44 of the regenerative chamber 3 that is directed away from the melting furnace 1. Due to the flow barrier 30', the combustion air is evenly distributed inside the regenerative chamber 3, and whereby the heat that has been stored by the grating 7 is evenly released to the combustion air.

Consequently, the flow barrier 30' serves for evening out the combustion air inside the regenerative chamber 3.

A person skilled in the art understands that the flow barriers 30, 30' in the corresponding regenerative chambers 2, 3 can also be installed above the transfer layers 28 and/or 40. In this variant, the flow barrier is thus disposed between the transfer layers and the grating. But no such variant is presently depicted.

Figure 5:
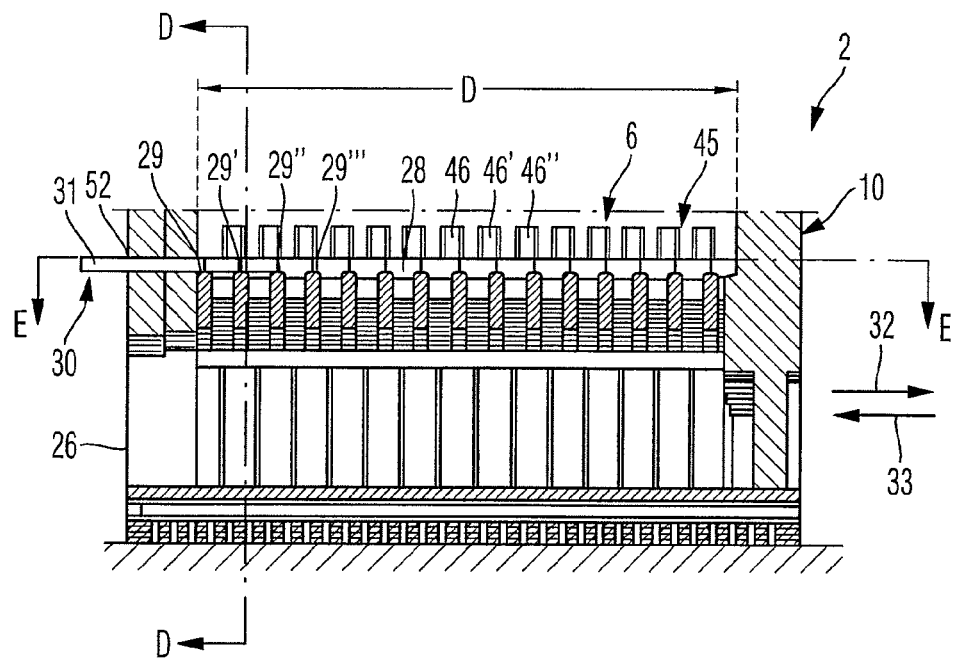
FIG. 5 an enlarged cut-out of the regenerative chamber as shown in FIG. 3.

FIG. 5 shows an enlarged cut-out of the regenerative chamber 2 as shown in FIG. 3.

In its lower region, the regenerative chamber 2 includes the slotted arches 29, 29', 29", 29''', and the transfer layers 28 are disposed above the same. The grating 6 is installed on the transfer layers 28, including multiple layers of checker bricks that are disposed on top of each other; the present figure only depicts the first layer 45 of checker bricks 46, 46', 46". Segment 31 of the flow barrier 30 is installed above the slotted arches 29, 29', 29", 29'''. In the present embodiment, segment 31 is configured a plate-shaped, meaning that said segment 31 is a plate element. It is understood that the segments of the flow barrier 30 can also have a different form. For example, individual segments of the flow barrier 30 can also be configured as bar-shaped. Segment 31 is inserted into the regenerative chamber 2 by means of an orifice 52 that is provided in the wall 10.

The segment 31 can either be pushed further into the regenerative chamber 2 or pulled out of the same again, whereby the cross-section of the regenerative chamber 2 can be adjusted in this region, meaning that it is also possible to thereby optimally adjust the flow behavior of the gas that flows in and out of regenerative chamber 2.

It is understood that the flow barrier 30' of the regenerative chamber 3 is structured in accordance with the flow barrier 30. Since the setup of the regenerative chamber 3 does not differ from the setup of regenerative chamber 2, any further description of regenerative chamber 3 with its flow barrier 30' has been omitted.

Figure 6:
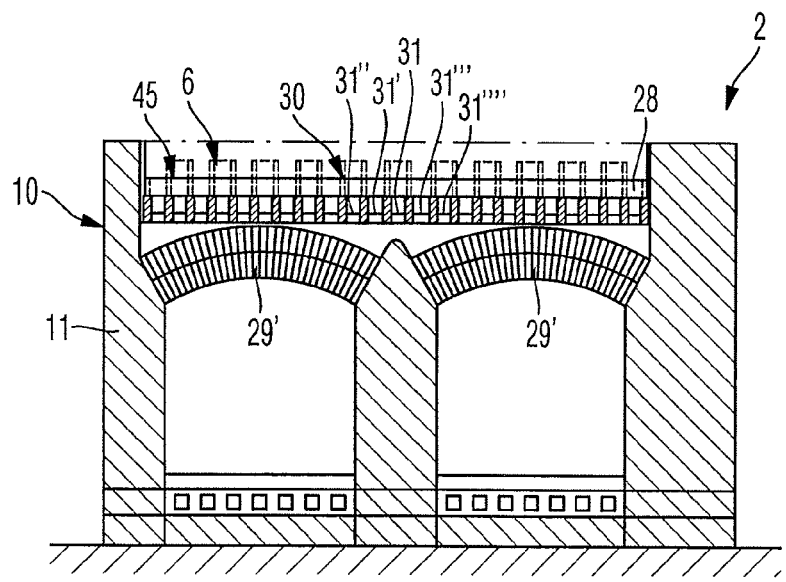
FIG. 6 a section D-D through the regenerative chamber as shown in FIG. 5.

FIG. 6 is a representation of a sectional view along the line D-D through the regenerative chamber 2 as shown in FIG. 5. In this view, the first layer 45 of the grating 6 is visible. Adjacent to segment 31, the further segments 31', 31'', 31''', 31'''' are provided that constitute, in conjunction, the flow barrier 30. The individual segments 31, 31', 31'', 31''', 31'''' of the flow barrier 30 can be moved independently of each other further in or out of the regenerative chamber 2. The individual segments 31, 31', 31'', 31''', 31'''' of the flow barrier 30 are disposed therein within the transfer layers 28 and are located above the slotted arch 29'.

Figure 7:
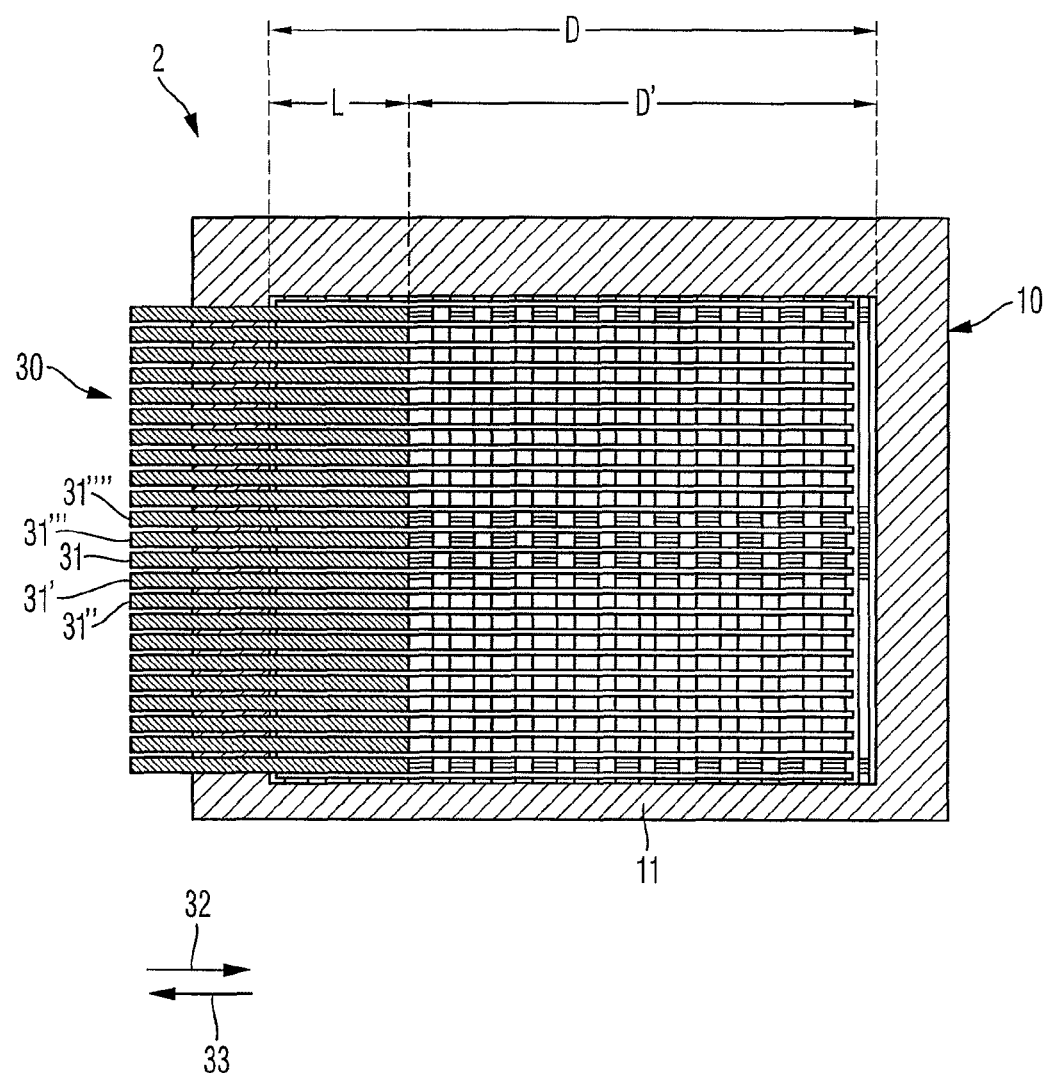
FIG. 7 a section E-E through the regenerative chamber as shown in FIG. 5.

FIG. 7 is a sectional view of the plane E-E through the regenerative chamber 2 as shown in FIG. 5. The grating is not visible in this representation. The flow barrier 30 with the individual segments 31, 31', 31'', 31''', 31'''', which are disposed adjacent relative to each other, is inserted into the regeneration chamber 2 through orifices that are disposed in the wall 10. The individual segments 31, 31', 31'', 31''', 31'''' of the flow barrier 30 can be moved in or out of the regenerative chamber 2 independently of each other, as indicated by arrows 32 and 33. In FIG. 7, however, the individual segments 31, 31', 31'', 31'', 31'''' have been inserted at equal depths into the inside of the regenerative chamber 2, whereby the cross-section D of the regenerative chamber 2 has been reduced. In this region, the regenerative chamber 2 only has a remaining cross-section D'. Said reduced cross-section D' is the result of D (cross-section of the regenerative chamber 2) minus L (length of the sections of the flow barrier 30 that are inserted into the regenerative chamber 2).

It is also possible to omit some of the segments; correspondingly, for example, each second or third segment of the flow barrier 30 can be removed. This creates a flow barrier 30 having gaps through which waste gases are able to pass.

Figure 8:
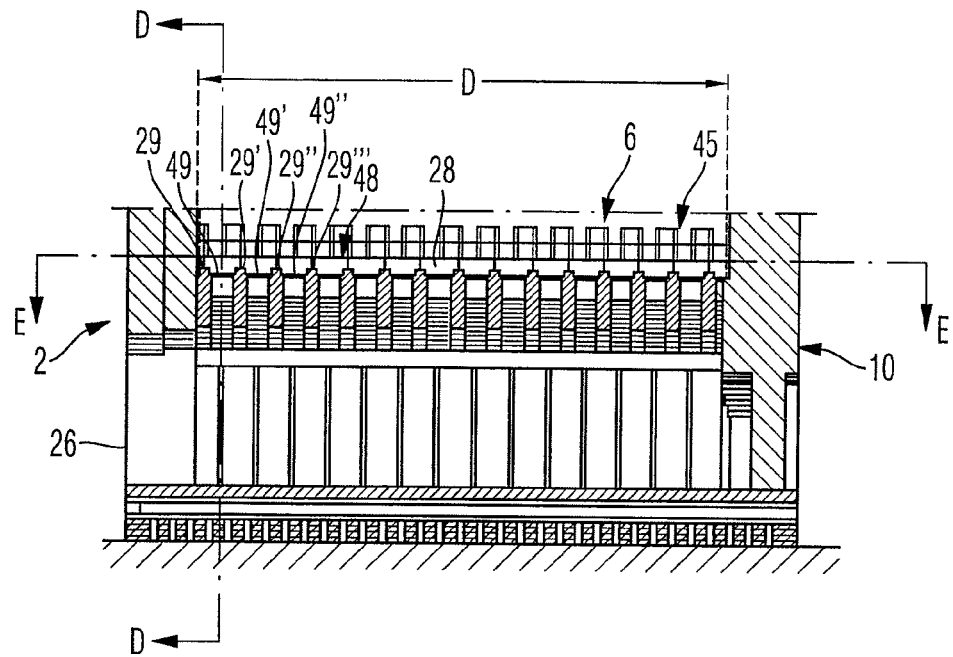
FIG. 8 an enlarged cut-out of the regenerative chamber as shown in FIG. 3 with a variant of a flow barrier.

FIG. 8 shows an enlarged cut-out of the regenerative chamber 2 as depicted in FIG. 3 with a variant of a flow barrier 48. An outlet 26 is, furthermore, disposed in the wall 10 of the regenerative chamber 2 through which waste gases are able to escape or through which combustion air can enter the regenerative chamber 2. The flow barrier 48 consists of three segments 49, 49', 49'' that are disposed adjacent relative to each other and that are at least in part supported, respectively, by two adjacent slotted arches 29, 29' and/or 29', 29'' and/or 29'', 29'''. Each of these segments 49, 49', 49'' can be moved into the plane of the image or away from the same. Contrary to the flow barrier 30, the flow barrier 48 is thus not disposed inside the transfer layers but below the transfer layers 28, and wherein the flow barrier 48 is at least in part disposed on the slotted arches 29, 29', 29'', 29'''. The grating 6 is disposed above the transfer layers, and wherein only the first layer of the grating 6 is presently shown.

If the goal is a reduction of the cross-section D of the regenerative chamber 2, this can be achieved by expanding the flow barrier 48 by one or multiple additional segments. By removing the three segments 49, 49'', 49'', it is thus possible to obtain a cross-section that corresponds to the cross-section D of the regenerative chamber 2.

Said segments 49, 49', 49'' as well can be consist of a metal alloy, a metal or of ceramic materials. As with segments 31, 31', 31'', 31''', 31'''' of flow barrier 30, the segments 49, 49', 49'' are configured as plate-shaped; however, it is also possible for individual segments 49, 49', 49'' to be configured, for example, as bar-shaped. The segments 49, 49', 49'' therein can have interruptions in and of themselves in the form of holes and/or slots. Gas can traverse the flow barrier 48 through these holes and/or slots.

The segments of the flow barrier 48 can also be in one piece, or they can consist of several individual segments that are combined into one segment. These individual segments can consist of a metal ally, a metal or of ceramic materials and can comprise interruptions therein. The interruptions in individual segments can also be holes and/or slots.

Figure 8A:
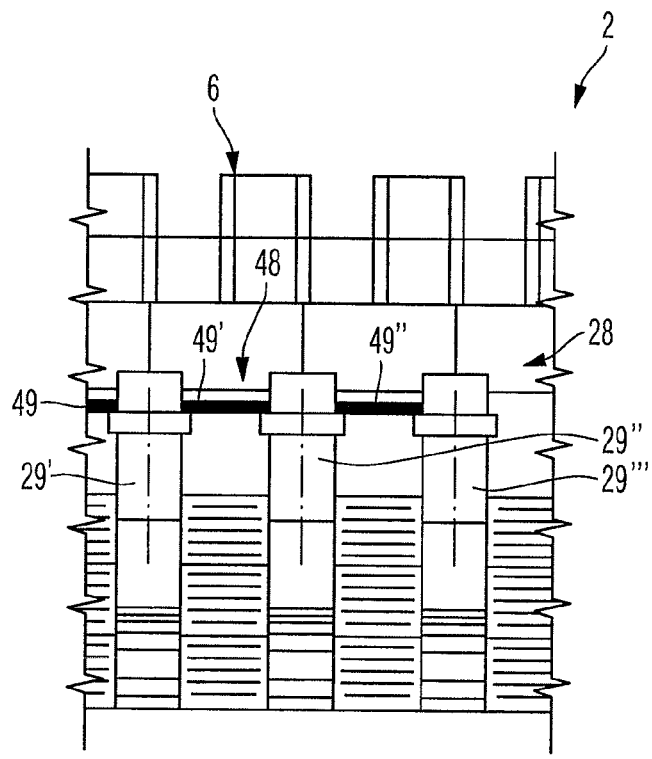
FIG. 8a an enlarged cut-out of the section of the regenerative chamber as shown in FIG. 8.

FIG. 8a is an enlarged cut-out of the section of the regenerative chamber 2 as represented in FIG. 8. It is clearly discernable how the flow barrier 48 is supported at least in part by the slotted arches 29', 29'', 29'''. Correspondingly, the segment 49' is partially supported by the slotted arch 29' and partially supported by the slotted arch 29''; and the segment 49'' is partially supported by slotted arch 29'' and partially by slotted arch 29'''. The transfer layers 28 are disposed above the slotted arches 29', 29'', 29'''.

Figure 9:
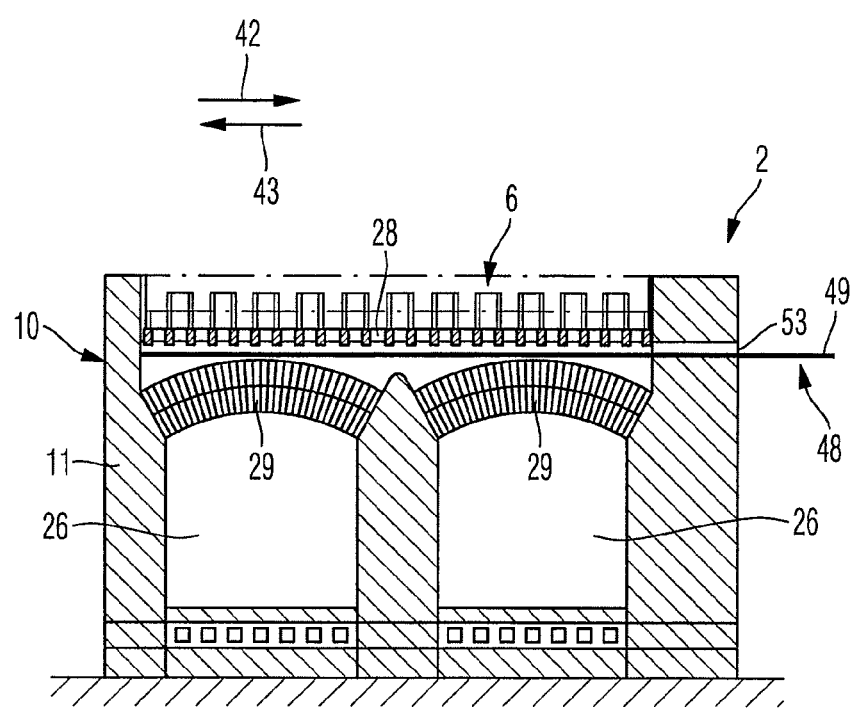
FIG. 9 a section D-D of the regenerative chamber as shown in FIG. 8.

FIG. 9 shows a sectional view of the plane along the line D-D of the regenerative chamber 2 as depicted in FIG. 8. Segment 49 of the flow barrier 48 is inserted into the regeneration chamber 2 through an orifice 53 in the wall 10, and wherein the orifice 53 is located across from the separating wall 11. Segment 49 of the flow barrier 48 therein is supported at least partially by the slotted arch 29, meaning the flow barrier 48 is disposed below the transfer layers 28 and, therefore, also below the grating 6. Segment 49 of the flow barrier 48 can be moved in the direction of the arrows 42 and/or 43. If the segment 49 is moved in the direction of arrow 42, the segment 49 can be moved out of the regenerative chamber 2.

The regenerative chamber 2 can thus have orifices for the insertion of a flow barrier located across from the melting chamber 12 of the glass melting furnace 1 and/or across from the separating wall 11. If the regenerative chamber has orifices that are located, on the one hand, across from the melting chamber 12 and, on the other hand, across from the separating wall 11, the cross-section D of the regenerative chamber 2 can optionally be reduced by the flow barrier 30 or the flow barrier 48.

Figure 10:
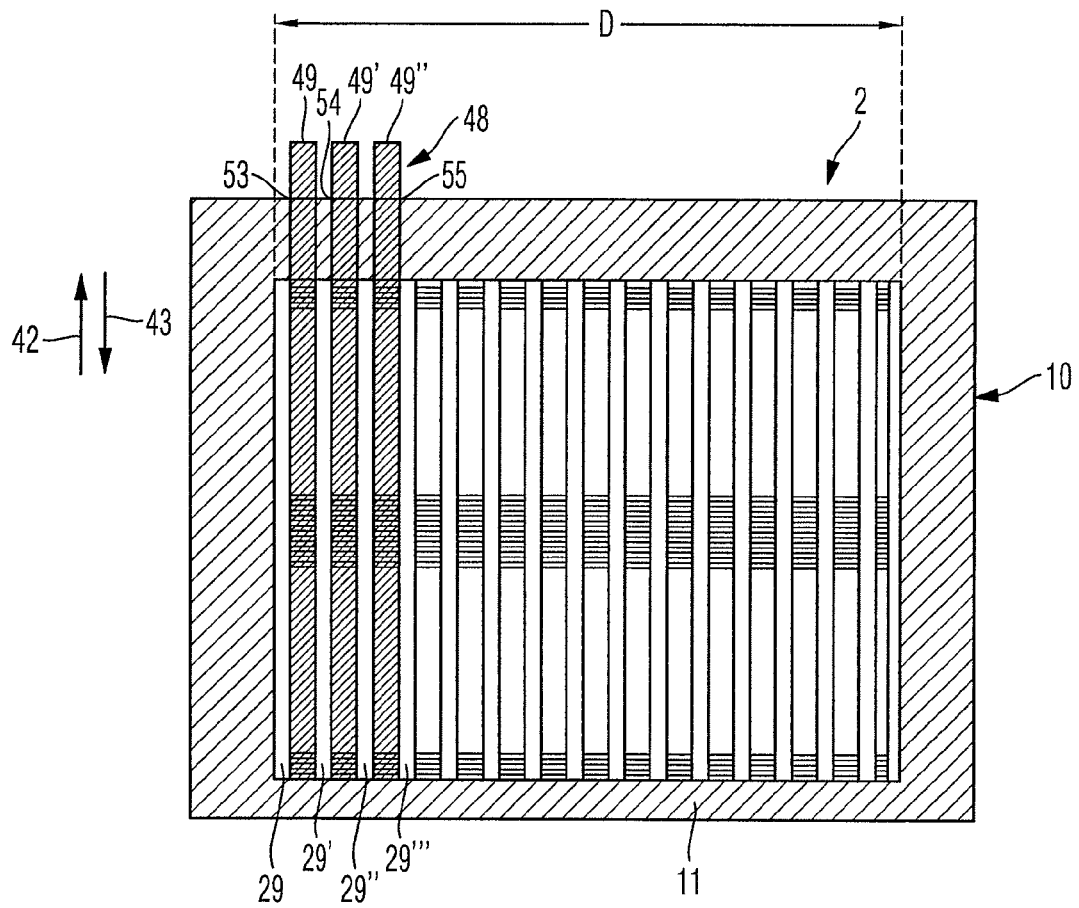
FIG. 10 a section E-E through the regenerative chamber as shown in FIG. 8.

FIG. 10 shows a section of a plane along the line E-E through the regenerative chamber 2 as depicted in FIG. 8. In this regenerative chamber 2, the three adjacently disposed segments 49, 49' and 49'' are at least partially supported by the slotted arches 29, 29', 29'' and/or 29'''. The segments 49, 49' and 49'' of the flow barrier 48 are inserted into the regenerative chamber 2 via the orifices 53, 54, 55 in the wall 10. The openings 53, 54, 55 are located across from the separating wall 11. The individual segments 49, 49' and 49'' therein can be moved out or in of the regenerative chamber 2, as indicated by the arrows 42 and 43. Adding further segments allows for a further reduction of the cross-section D of the regenerative chamber 2, which has been omitted in FIG. 10. If one of the segments 49, 49' and 49'' is removed, the cross-section of the regenerative chamber 2 is enlarged once more in the area of the slotted arches 29, 29', 29'', 29'''.

Moreover, it is possible, for example, to remove the first or second segment 49, 49' in order to obtain a flow barrier 48 having a gap.

It is understood that a flow barrier corresponding to the flow barrier 48 can also be inserted into the regenerative chamber 3. However, due to the fact that the setup of the regenerative chamber 3 is identical to the setup of the regenerative chamber 2, any description of the regenerative chamber 3 with such a flow barrier has been omitted.

Regenerative chambers 2 and/or 3 that have been configured as individual chambers can also be designed as one double chamber. In a regenerative chamber that is configured as a double chamber, the corresponding flow barrier can also be disposed above, within or below the transfer layers as provided by the transfer layers of the corresponding regenerative chamber.

Therefore, it is advantageous with regard to the flow barrier 48 that is possible to reduce the cross-section of the regenerative chambers 2 and/or 3 using only very few segments. On the other hand, it is advantageous with regard to flow barrier 30 that the cross-section D' of the regenerative chamber 2 and/or 3 can be adjusted with great precision.

Although the embodiments according to the invention have been described in detail above, the scope of protection of the present invention is not limited to these embodiments. A person skilled in the art understands that the scope of protection includes different variants that achieve the same result as the embodiments described herein. Therefore, for a person skilled in the art, it is clear that the described embodiments do not limit the scope of protection and that further variants, modifications and alternative solutions are possible that fall into the scope of protection of the claims.

| List of Reference Symbols: | |
|---|---|
| 1 | Glass melting furnace |
| 2 | Regenerative chamber |
| 3 | Regenerative chamber |
| 4 | Burner neck |
| 5 | Burner neck |
| 6 | Grating |
| 7 | Grating |
| 8 | Checker brick |
| 9 | Checker brick |
| 10 | Wall |
| 11 | Separating wall |
| 12 | Melting chamber |
| 13 | Orifice |
| 14 | Orifice |
| 15 | Arrow |
| 16 | Arrow |
| 17 | Passage |
| 18 | Distributor |
| 19 | Spring connection |
| 20 | Feeder house |
| 21 | Configuration |
| 22 | Melt |
| 23 | Melting charge |
| 24 | Flow arrow |
| 25 | Transfer layers |
| 26 | Outlet |
| 27 | Layer of the checker bricks |
| 28 | Transfer layers |
| 29 | Slotted arch |
| 30 | Flow barrier |
| 31 | Segment |
| 32 | Arrow |
| 33 | Arrow |
| 34 | Flame |
| 35 | Nozzle inlet location |
| 36 | Arrow |
| 37 | Section of regenerative chamber 2 |
| 38 | Nozzle inlet location |
| 39 | Arrow |
| 40 | Transfer layers |
| 41 | Slotted arch |

| List of Reference Symbols: | |
|---|---|
| 42 | Arrow |
| 43 | Arrow |
| 44 | Section of regenerative chamber 3 |
| 45 | Layer |
| 46 | Checker brick |
| 47 | Checker brick |
| 48 | Flow barrier |
| 49 | Segment |
| 50 | Wall |
| 51 | Roof |
| 52 | Orifice |
| 53 | Orifice |
| 54 | Orifice |
| 55 | Orifice |

The invention claimed is:

1. A regenerative chamber for a glass melting furnace having a defined horizontal cross-section transverse to a gas flow through the regenerative chamber and wherein the regenerative chamber includes multiple slotted arches and above the same there are disposed transfer layers, and wherein a grating is installed on the transfer layers, comprising:
a moveable flow barrier provided below an entirety of the grating and extending out of a wall of the regenerative chamber and configured to be moved through an opening in the wall of the regenerative chamber, from the outside, into and out of the regenerative chamber for modification of the cross-section of the gas flow in a region of the transfer layers to change a distribution of gas flow inside the grating of the regenerative chamber, wherein the multiple slotted arches each includes a shoulder disposed below top most surfaces of the multiple slotted arches, and wherein the movable flow barrier is supported on top of the shoulders of the multiple slotted arches, and wherein a top surface of the moveable flow barrier is below the top most surfaces of the multiple slotted arches.

2. The regenerative chamber according to claim 1, wherein the flow barrier comprises multiple segments.

3. The regenerative chamber according to claim 2, wherein the segments are configured as one of plate-shaped or bar-shaped.

4. The regenerative chamber according to claim 2, wherein the segments comprise one of metal, a metal alloy and ceramic materials.

5. The regenerative chamber according to claim 2, wherein the wall of the regenerative chamber includes multiple orifices through which the flow barrier is inserted into the regenerative chamber.

6. The regenerative chamber according to claim 1, wherein the flow barrier is disposed below the transfer layers.

7. The regenerative chamber according to claim 2, wherein the segments include interruptions.

8. The regenerative chamber according to claim 7, wherein the segments comprise multiple individual segments that are connected to each other.

9. The regenerative chamber according to claim 8, wherein the individual segments include interruptions.

10. The regenerative chamber according to claim 8, wherein the individual segments comprise one of metal, a metal alloy and a ceramic material.

11. The regenerative chamber according to claim 7, wherein the interruptions are holes and/or slots.

12. A regenerative chamber for a glass melting furnace comprising:
- a defined horizontal cross-section transverse to a gas flow through the regenerative chamber,
- multiple slotted arches,
- transfer layers disposed above the multiple slotted arches,
- a grating installed on the transfer layers,
- a wall enclosing the grating, and
- a movable flow barrier below an entirety of the grating, extending out of the wall of the regenerative chamber, and inserted from the outside into the regenerative chamber, through an opening in the wall of the regenerative chamber, and by means of which the cross-section of the gas flow in a region of the transfer layers is modified to change a distribution of gas flow inside the grating of the regenerative chamber,
- wherein the multiple slotted arches each include a shoulder disposed below top most surfaces of the multiple slotted arches, and wherein the moveable flow barrier is supported on top of the shoulders of the multiple slotted arches, and wherein a top surface of the moveable flow barrier is below the top most surfaces of the multiple slotted arches.

13. The regenerative chamber according to claim 12, wherein the flow barrier is disposed below the transfer layers.

14. A regenerative chamber for a glass melting furnace having a single burner neck and a single associated opening connecting the regenerative chamber to a melting chamber of the glass melting furnace and wherein all of the combustion air required in the melting chamber while the regenerative chamber is being utilized for introduction of combustion air to the melting chamber passes through a first opening, and wherein all waste gases generated in the melting chamber while the regenerative chamber is being utilized for removal of heat from the waste gases pass through a second opening, the regenerative chamber having a defined horizontal cross-section transverse to a flow of gas through the regenerative chamber and wherein the regenerative chamber includes multiple slotted arches and above the same there are disposed transfer layers, and wherein a grating is installed on the transfer layers, comprising:
- a movable flow barrier comprising multiple segments that are provided below an entirety of the grating, such that each segment can be individually moved through a separate opening in a wall of the regenerative chamber, from the outside, into and out of the regenerative chamber for modification of the cross-section of the gas flow in a region of the transfer layers to change a distribution of gas flow inside the grating of the regenerative chamber,
- wherein the multiple slotted arches each include a shoulder disposed below top most surfaces of the multiple slotted arches, and wherein each segment of the moveable flow barrier is supported on top of shoulders of adjacent slotted arches, and wherein a top surface of each of the segments of the moveable flow barrier is below the top most surface of the multiple slotted arches.

* * * * *